(12) United States Patent
Chen

(10) Patent No.: US 11,235,446 B2
(45) Date of Patent: Feb. 1, 2022

(54) OPENING STRUCTURE OF TOOL GRIP

(71) Applicant: Tzu Yu Chen, Dali (TW)

(72) Inventor: Tzu Yu Chen, Dali (TW)

( * ) Notice: Subject to any disclaimer, the term of this patent is extended or adjusted under 35 U.S.C. 154(b) by 191 days.

(21) Appl. No.: 16/746,502

(22) Filed: Jan. 17, 2020

(65) Prior Publication Data

US 2021/0220975 A1 Jul. 22, 2021

(51) Int. Cl.
*B25B 23/00* (2006.01)
*B25B 23/16* (2006.01)
*B25B 7/08* (2006.01)
*F16F 1/42* (2006.01)

(52) U.S. Cl.
CPC ............ *B25B 23/0007* (2013.01); *B25B 7/08* (2013.01); *B25B 23/16* (2013.01); *F16F 1/428* (2013.01)

(58) Field of Classification Search
CPC ......... B25B 7/08; B25B 7/00; B25B 23/0007; B25B 23/16
See application file for complete search history.

(56) References Cited

U.S. PATENT DOCUMENTS 6,263,770 B1 * 7/2001 Gomas .................... B25B 7/00
  81/427
7,975,577 B2 * 7/2011 Pfab ...................... B26B 13/16
  81/417

\* cited by examiner

*Primary Examiner* — David B. Thomas
(74) *Attorney, Agent, or Firm* — Muncy, Geissler, Olds & Lowe, P.C.

(57) ABSTRACT

An opening structure of a tool grip includes a left grip and a right grip that are intersected and pivoted. An elastic connecting strap is provided between the left and right grips. The left grip has at least two left studs. The right grip has at least two right studs. The connecting strap has a length greater than a distance between the left and right grips. One end of the connecting strap has at least two left recessed portions for engagement of the left studs. Another end of the connecting strap has at least two right recessed portions for engagement of the right studs. By selecting the position where the left recessed portions are engaged with the left studs and the position where the right recessed portions are engaged with the right studs, a force that the connecting strap pushes against the left and right grips to open is adjustable.

3 Claims, 5 Drawing Sheets

OPENING STRUCTURE OF TOOL GRIP

FIELD OF THE INVENTION

The present invention relates to a hand tool, and more particularly to an opening structure of a tool grip.

BACKGROUND OF THE INVENTION

Pliers, pincers, and the like are commonly used hand tools in our daily life, comprising two grips that are intersected and pivoted together. When in use, the user can hold the two grips to open and close the two grips with his/her fingers. However, common hand tools don't have a structure to assist in opening and closing the two grips, which makes it difficult to operate the hand tool and causes muscle fatigue and soreness easily.

As shown in FIG. 6, an improved hand tool comprises a spring 53 between two grips 51, 52. The spring 53 normally stretches in both directions to push against the two grips 51, 52 in an open manner. Accordingly, as long as the user releases his/her hand, the two grips 51, 52 can be automatically opened. This can save the force for fingers to open the grips 51, 52, so it is easy to use. However, in the above-mentioned structure, the elastic force of the spring 53 pushing the two grips 51, 52 is an immovable value and cannot be adjusted, and it is still an operational burden for a user with less palm strength. Accordingly, the inventor of the present invention has devoted himself based on his many years of practical experiences to solve these problems.

SUMMARY OF THE INVENTION

The primary object of the present invention is to provide an opening structure of a tool grip which can arbitrarily mate a connecting strap with studs on a grip for adjusting the force that the connecting strap pushes against the grip to open the grip so as to meet the needs of the user.

In order to achieve the above object, the present invention provides an opening structure of a tool grip, comprising a left grip, a right grip, and an elastic connecting strap. The left grip has at least two left studs at different heights. The right grip is intersected and pivoted to the left grip. The right grip has at least two right studs at different heights. A distance between a lower one of the left studs and a lower one of the right studs is greater than a distance between an upper one of the left studs and an upper one of the right studs. The connecting strap has a length greater than a distance between the left and right grips. One end of the connecting strap is provided with at least two left recessed portions for engagement of the left studs. Another end of the connecting strap is provided with at least two right recessed portions for engagement of the right studs. A force that the connecting strap pushes against the left grip and the right grip to open is adjustable by selecting a position where the left recessed portions are engaged with the left studs and a position where the right recessed portions are engaged with the right studs.

In an embodiment, each of the left and right studs has a flange on a top end thereof.

Preferably, each of the left and right recessed portions is a perforation, and the perforation is provided with a stepped portion corresponding to the flange.

DETAILED DESCRIPTION OF THE PREFERRED EMBODIMENTS

Embodiments of the present invention will now be described, by way of example only, with reference to the accompanying drawings.

Figure 1:
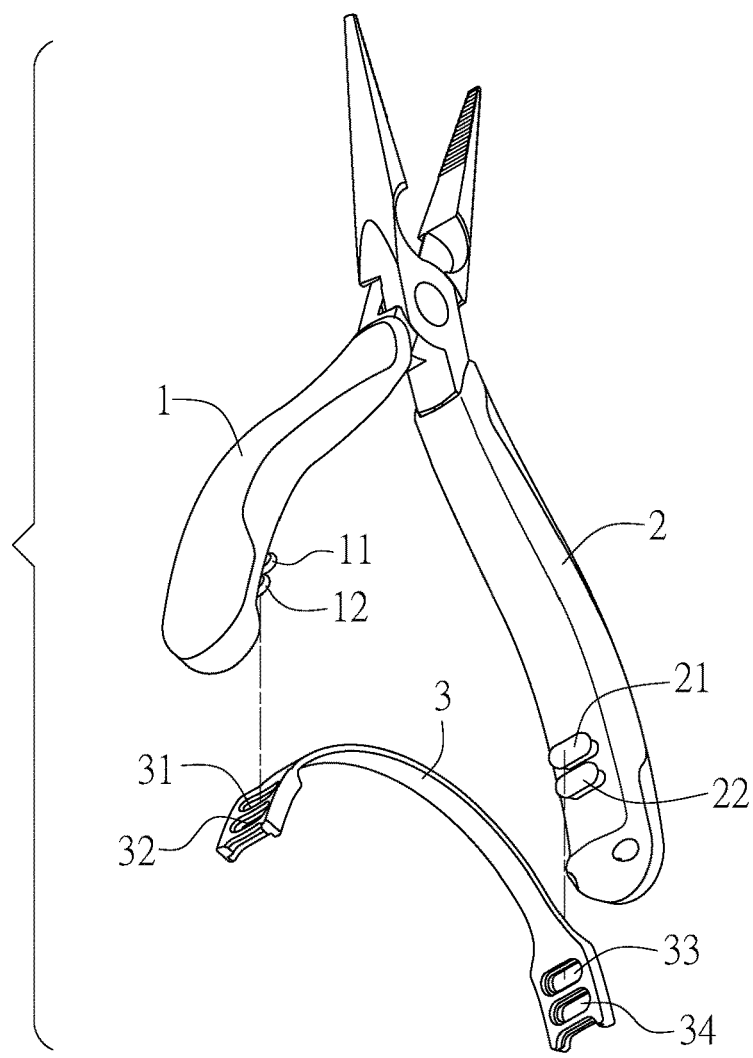
FIG. 1 is an exploded view of the present invention.

Referring to FIG. 1, an opening structure of a tool grip according to an embodiment of the present invention comprises a left grip 1 and a right grip 2 that are intersected and pivoted together. An elastic connecting strap 3 is provided between the left grip 1 and the right grip 2. The left grip 1 is provided with at least two left studs at different heights near a bottom end of the left grip 1. In this embodiment, the number of the left studs is two. The two left studs are defined as a first left stud 11 and a second left stud 12, respectively. The right grip 2 is provided with at least two right studs at different heights near a bottom end of the right grip 2. In this embodiment, the number of the right studs is two. The two right studs are defined as a first right stud 21 and a second right stud 22, respectively. The studs on the left grip 1 face and correspond in position to the studs on the right grip 2. The distance between the second left stud 12 and the second right stud 22 that are located in a lower position is greater than the distance between the first left stud 11 and the first right stud 21 that are located in a higher position.

The connecting strap 3 has a length greater than the distance between the left grip 1 and the right grip 2, and can form an elastic force for returning to its original shape after bending both ends thereof. The left end of the connecting strap 3 is provided with at least two left recessed portions for engagement of the left studs. In this embodiment, the number of the left recessed portions is two. The two left recessed portions are defined as a first left recessed portion 31 and a second left recessed portion 32, respectively. The right end of the connecting strap 3 is provided with at least two right recessed portions for engagement of the right studs. In this embodiment, the number of the right recessed portions is two. The two right recessed portions are defined as a first right recessed portion 33 and a second right recessed portion 34, respectively.

Figure 2:
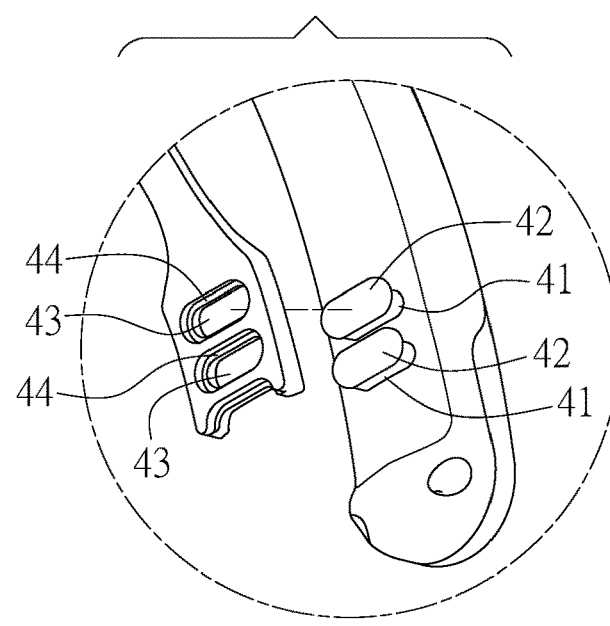
FIG. 2 is a partial, enlarged view of the present invention.

As shown in FIG. 2, each of the studs has a cylindrical body 41 and an enlarged flange 42 formed on the top of the cylindrical body 41. Each of the recessed portions is a perforation 43 through which each stud can pass, and the perforation 43 is provided with a stepped portion 44 corresponding to the flange 42. After the cylindrical body 41 and the flange 42 of each stud passes through the perforation 43 of the connecting strap 3, as shown in FIG. 3, the flange 42 is engaged with the stepped portion 44 so as not to fall off, so that the connecting strap 3 is secured to the left grip 1 and the right grip 2 accordingly.

After the connecting strap 3 is secured on the left grip 1 and the right grip 2, the connecting strap 3 is forced to have a curved shape because the length of the connecting strap 3 is greater than the distance between the left grip 1 and the right grip 2 to generate a restoring force pushing against the two grips 1, 2 and then push away the left and right grips 1, 2 normally. Accordingly, in use, when the user releases his/her hand, the connecting strap 3 immediately opens the left and right grips 1, 2 due to the elastic restoring force.

The magnitude of the elastic restoring force of the connecting strap 3 depends on the degree of bending the connecting strap 3, and the degree of bending the connecting strap 3 can be determined by its position on the left and right grips 1, 2. In detail, as shown in FIG. 3, the first left recessed portion 31 and the second left recessed portion 32 of the connecting strap 3 are engaged with the first left stud 11 and the second left stud 12 of the left grip 1, respectively. The first right recessed portion 33 and the second right recessed portion 34 are engaged with the first right stud 21 and the second right stud 22 of the right grip 2, respectively. In FIG. 4, the lower second left recessed portion 32 of the connecting strap 3 is engaged with the upper first left stud 11 of the left grip 1, and the lower second right recessed portion 34 is engaged with the upper first right stud 21 of the right grip 2, that is, the position of the connecting strap 3 is higher than the position shown in FIG. 3. After making a comparison, because the connecting strap 3 is secured to the first left stud 11 and the first right stud 21 that have a small distance therebetween, as shown in FIG. 4, the degree of bending is greater, and then a larger elastic restoring force is generated, that is, the left and right grips 1, 2 are easily pushed away. Conversely, because the connecting strap 3 is secured to the second left stud 12 and the second right stud 22 that have a large distance therebetween, as shown in FIG. 3, the degree of bending is small, and then a small elastic restoring force is generated. The left and right grips 1, 2 are pressed and closed more easily, which is suitable for users with less palm strength.

Figure 3:
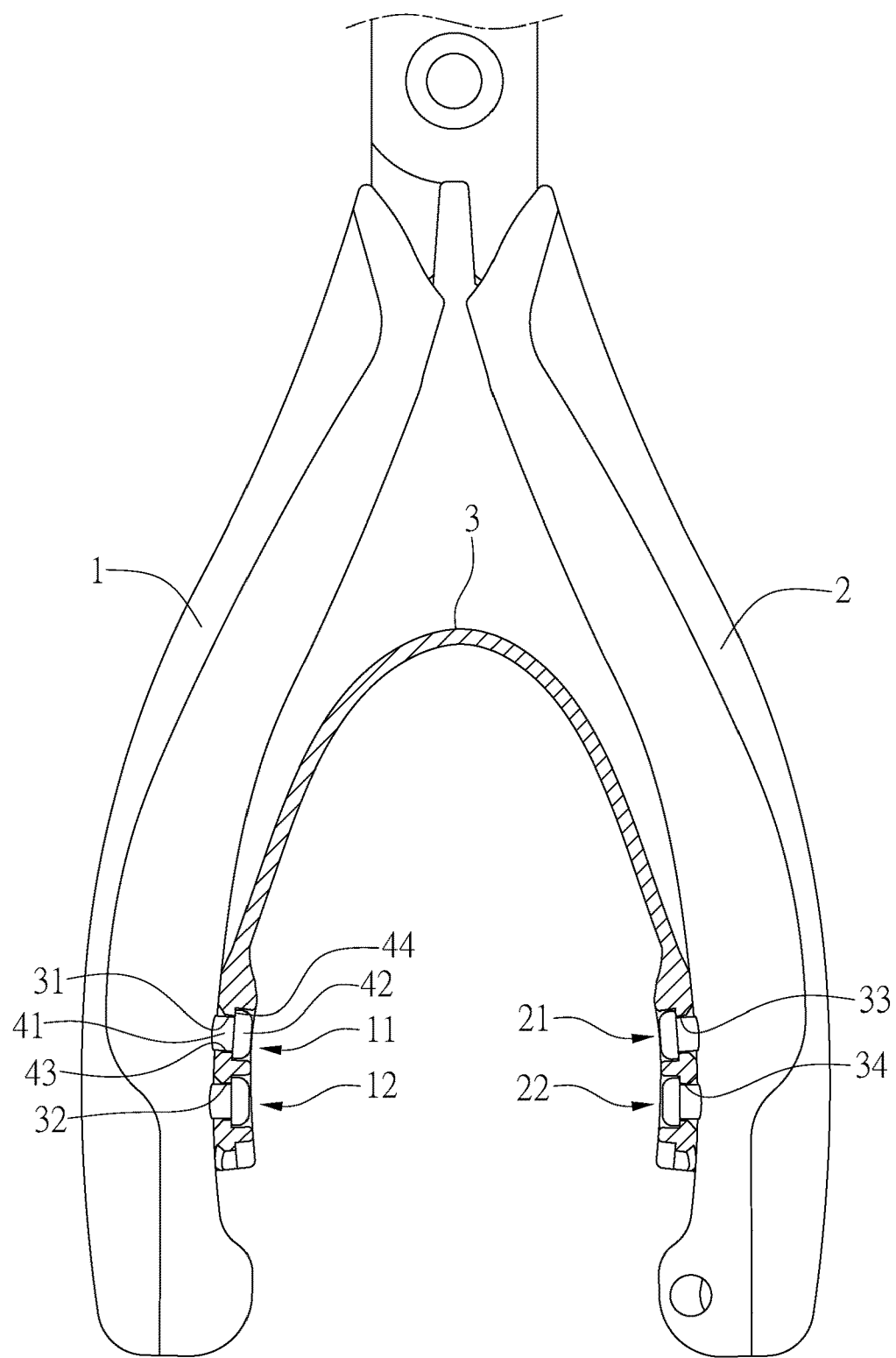
FIG. 3, FIG. 4 and FIG. 5 are schematic views of the present invention when in use.
Figure 4:
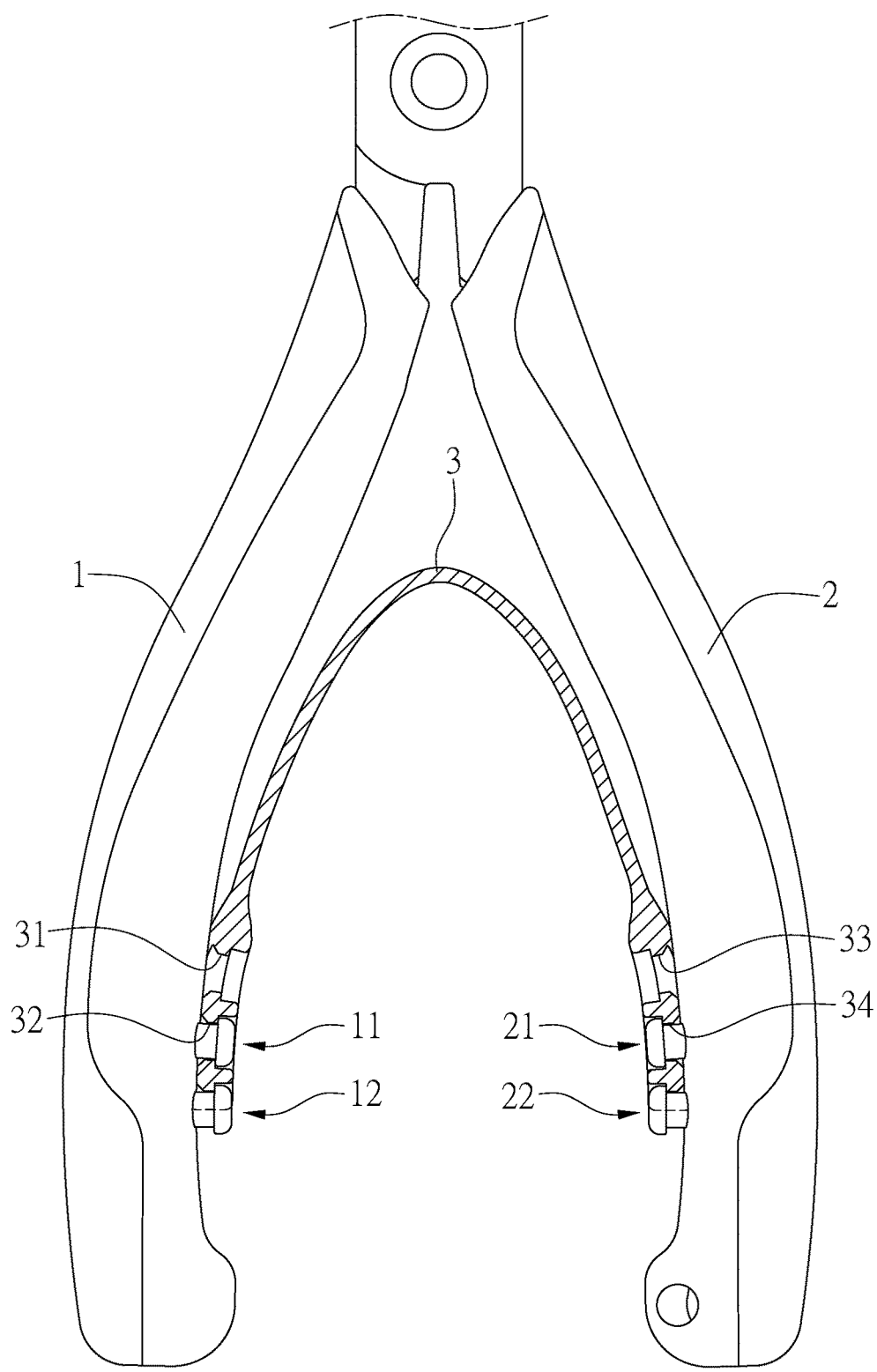
Figure 5:
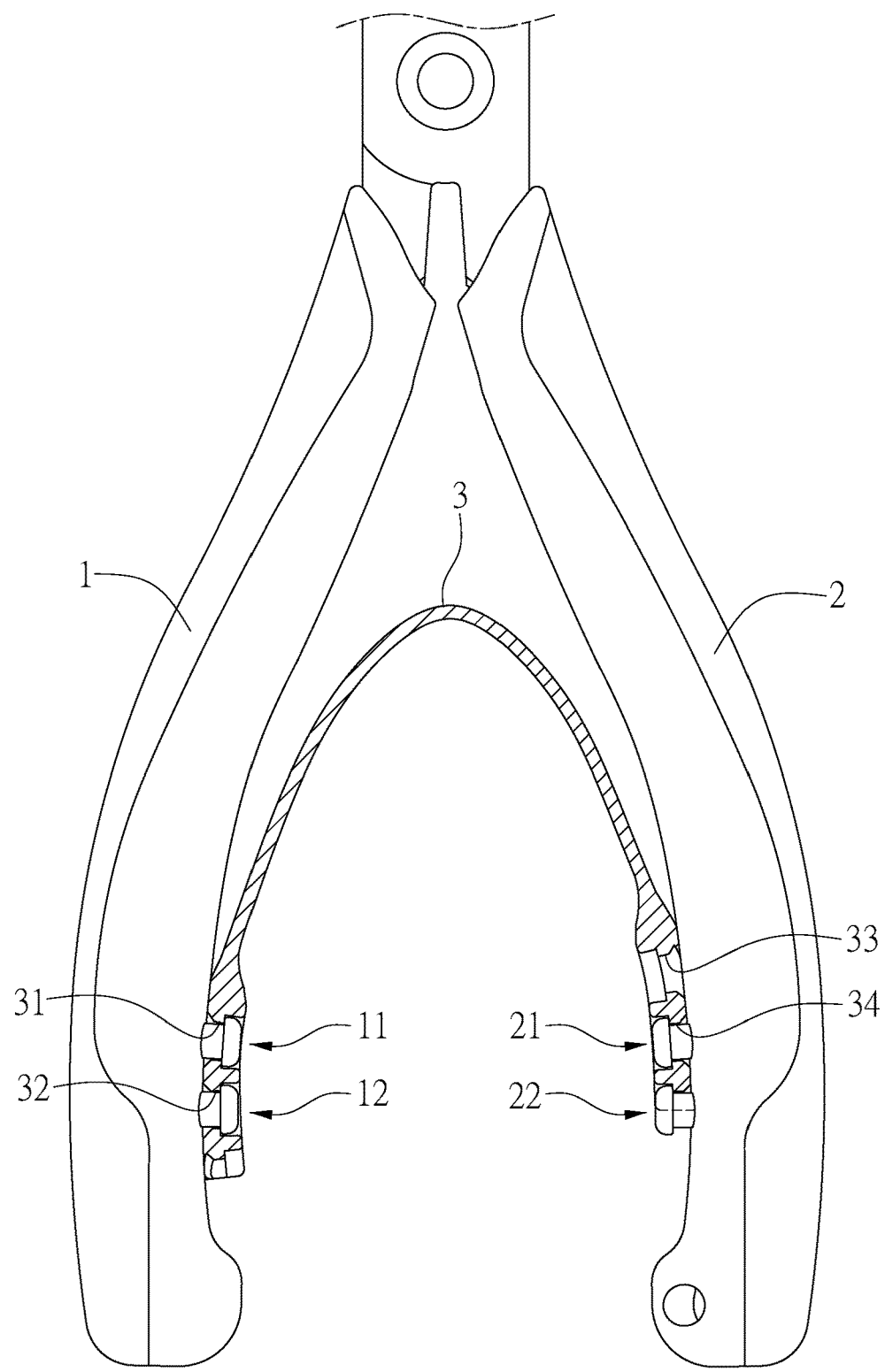
Figure 6:
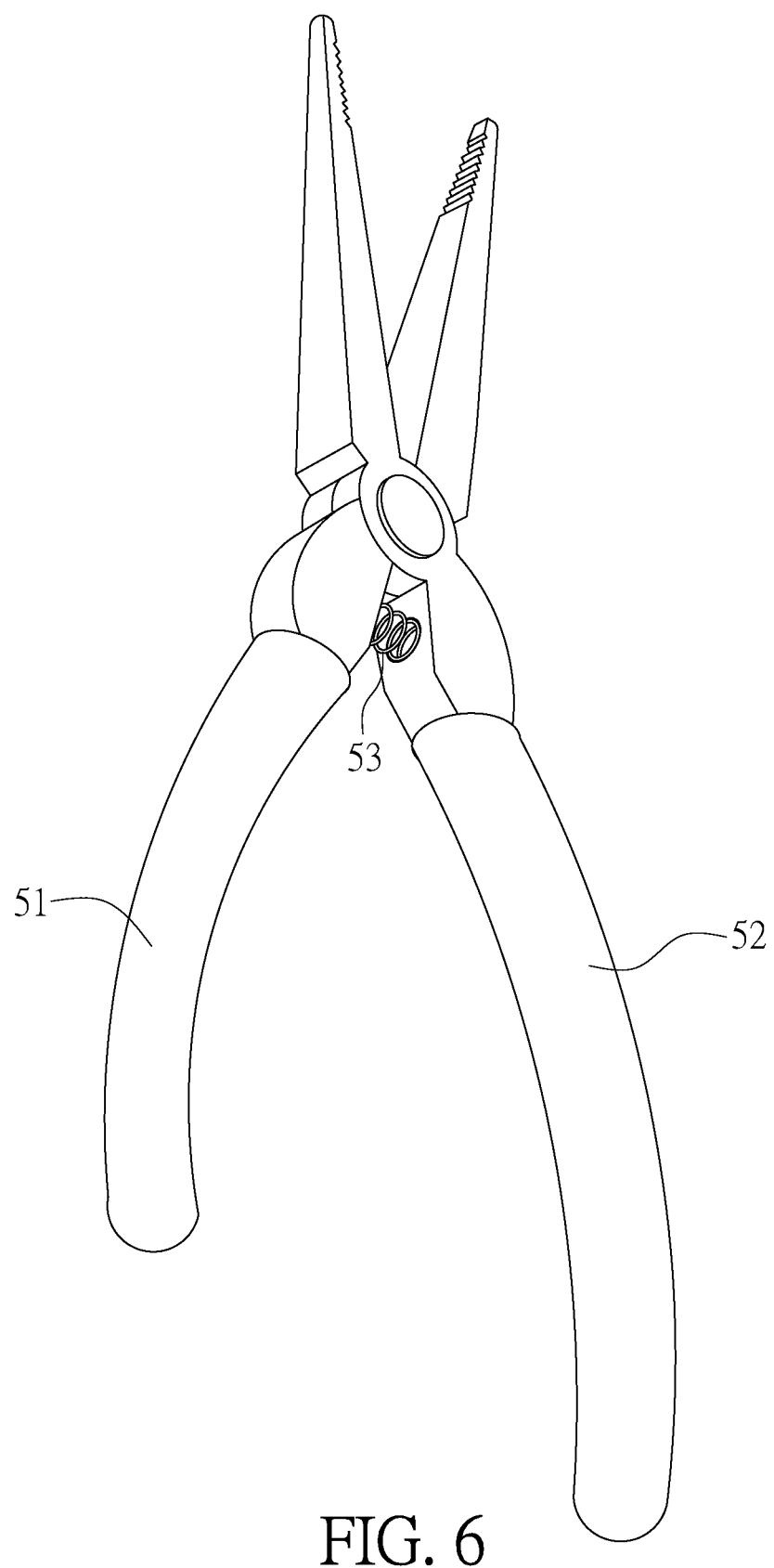
FIG. 6 is a perspective view of a conventional hand tool.

On the other hand, in addition to being secured in the positions shown in FIG. 3 and FIG. 4, the connecting strap 3 can be arbitrarily changed in its secured position according to actual use needs. As shown in FIG. 5, the first left recessed portion 31 and the second left recessed portion 32 of the connecting strap 3 are engaged with the first left stud 11 and the second left stud 12 of the left grip 1 respectively, and the lower second right recessed portion 34 is engaged with the upper first right stud 21 of the right grip 2. In this way, the connecting strap 3 can generate an elastic restoring force of a different magnitude from the aforementioned, so as to meet the use needs.

In summary, the present invention uses the recessed portions on both sides of the connecting strap 3 to arbitrarily mate with the studs of the grips, respectively, so as to set and slightly adjust the elastic restoring force of the connecting strap 3. By adjusting the elastic restoring force to change the opening angle of the left grip 1 and the right grip 2, the shortcoming that the prior art has an immovable elastic restoring force and opening angle can be improved.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An opening structure of a tool grip, comprising:
    a left grip, having at least two left studs at different heights;
    a right grip, intersected and pivoted to the left grip, the right grip having at least two right studs at different heights, a distance between a lower one of the left studs and a lower one of the right studs being greater than a distance between an upper one of the left studs and an upper one of the right studs;
    an elastic connecting strap, having a length greater than a distance between the left and right grips, one end of the connecting strap being provided with at least two left recessed portions for engagement of the left studs, another end of the connecting strap being provided with at least two right recessed portions for engagement of the right studs, wherein a force that the connecting strap pushes against the left grip and the right grip to open is adjustable by selecting a position where the left recessed portions are engaged with the left studs and a position where the right recessed portions are engaged with the right studs.

2. The opening structure of the tool grip as claimed in claim 1, wherein each of the left and right studs has a flange on a top end thereof.

3. The opening structure of the tool grip as claimed in claim 2, wherein each of the left and right recessed portions is a perforation, and the perforation is provided with a stepped portion corresponding to the flange.

* * * * *